US012090090B2

(12) United States Patent
Baker

(10) Patent No.: US 12,090,090 B2
(45) Date of Patent: Sep. 17, 2024

(54) REMOVABLE WEATHER SHIELD DEVICE FOR MEDICAL STRETCHERS

(71) Applicant: Jennifer Baker, Casselberry, FL (US)

(72) Inventor: Jennifer Baker, Casselberry, FL (US)

( * ) Notice: Subject to any disclaimer, the term of this patent is extended or adjusted under 35 U.S.C. 154(b) by 737 days.

(21) Appl. No.: 17/183,139

(22) Filed: Feb. 23, 2021

(65) Prior Publication Data

US 2022/0265493 A1 Aug. 25, 2022

(51) Int. Cl.
*A61G 1/04* (2006.01)

(52) U.S. Cl.
CPC ............ *A61G 1/04* (2013.01); *A61G 2203/70* (2013.01)

(58) Field of Classification Search
CPC .. A61G 1/04; B62B 9/14; B62B 9/142; B62B 9/145; B60J 11/00; B60J 11/06; A47C 29/003
See application file for complete search history.

(56) References Cited

U.S. PATENT DOCUMENTS 2,190,867 A * 2/1940 Felciano .............. A47C 29/006 5/413 R
3,121,881 A * 2/1964 Schnell .................. A61G 1/013 5/627
3,798,685 A * 3/1974 Hunt ........................ A61G 1/04 5/505.1
5,511,259 A * 4/1996 Tarara ...................... A61G 1/04 135/147
5,758,889 A * 6/1998 Ledakis .................... B62B 9/14 280/47.38
5,950,625 A * 9/1999 Bongiovanni ......... A61B 90/40 128/845
5,975,081 A * 11/1999 Hood ....................... A61G 1/04 128/845
5,975,558 A * 11/1999 Sittu ....................... B62B 9/142 280/47.38
6,001,057 A * 12/1999 Bongiovanni ......... A61G 10/04 5/629
6,014,837 A * 1/2000 Morgan ............. A01G 13/0212 135/125
6,076,206 A * 6/2000 Celaya ................. A47C 29/003 5/113

(Continued)

FOREIGN PATENT DOCUMENTS

WO WO-2023129431 A1 * 7/2023 ........... A61G 10/005

*Primary Examiner* — Jeffrey J Restifo
(74) *Attorney, Agent, or Firm* — Jason T. Daniel, Esq.; Daniel Law Offices, P.A.

(57) ABSTRACT

A weather shield device for a medical stretcher includes a generally square-shaped malleable main body member that is constructed from one or more layers of waterproof fabric. An elongated hollow channel is positioned along the periphery of the main body for receiving and housing a self-supporting frame. The frame and main body are transitioned between a folded position, a fully open position and an arched position for use with a stretcher. A plurality of connectors are disposed along the sides of the main body and function to selectively engage the sides of a medical stretcher. When secured onto the stretcher, the frame forms an arched shape so as to fully cover the stretcher with the waterproof main body, and a pair of semi-rigid struts maintain a set separation distance between the sides of the main body when in the arched position.

13 Claims, 3 Drawing Sheets

(56) References Cited

U.S. PATENT DOCUMENTS

| | | | | | |
|---|---|---|---|---|---|
| 6,155,628 | A * | 12/2000 | Williams | B62B 9/142 | 280/47.38 |
| 6,173,725 | B1 * | 1/2001 | Garth | A47C 7/66 | 280/47.38 |
| 6,217,099 | B1 * | 4/2001 | McKinney | B62B 9/142 | 280/47.38 |
| 6,224,073 | B1 * | 5/2001 | Au | B62B 9/142 | 280/47.38 |
| 9,644,390 | B1 * | 5/2017 | Garvens | A47C 21/00 | |
| 10,040,470 | B1 * | 8/2018 | Horowitz | B62B 3/102 | |
| 10,384,705 | B1 * | 8/2019 | Baptichon | B62B 9/20 | |
| 11,369,208 | B2 * | 6/2022 | Skelton | A61G 10/005 | |
| 2005/0241648 | A1 * | 11/2005 | Dobbs | A61G 1/04 | 128/857 |
| 2007/0018415 | A1 * | 1/2007 | Koch | F24F 1/0071 | 280/47.38 |
| 2007/0182198 | A1 * | 8/2007 | Michelau | B62B 9/147 | 296/100.06 |
| 2008/0203757 | A1 * | 8/2008 | Gilberg | B62B 9/145 | 296/100.16 |
| 2012/0031448 | A1 * | 2/2012 | Brensinger | F04B 33/00 | 5/413 R |
| 2012/0284916 | A1 * | 11/2012 | Hill | A61G 5/10 | 160/239 |
| 2014/0090680 | A1 * | 4/2014 | Reis | A61G 1/017 | 135/96 |
| 2015/0020857 | A1 * | 1/2015 | Dominick | A61G 1/04 | 135/90 |
| 2016/0115704 | A1 * | 4/2016 | Burke | A61G 5/10 | 135/126 |
| 2018/0132446 | A1 * | 5/2018 | Jakubowski | B62B 7/105 | |
| 2018/0170418 | A1 * | 6/2018 | Choi | C08L 63/00 | |
| 2018/0325289 | A1 * | 11/2018 | Fung-A-Wing | A47C 21/00 | |
| 2020/0179193 | A1 * | 6/2020 | Guillermo | A47C 29/003 | |
| 2021/0316804 | A1 * | 10/2021 | Payne | B62B 5/067 | |
| 2021/0323390 | A1 * | 10/2021 | Halim | A61G 5/10 | |
| 2021/0370999 | A1 * | 12/2021 | Filipovitz | B60J 1/2011 | |
| 2022/0040020 | A1 * | 2/2022 | Oakes | A61G 1/04 | |
| 2022/0204068 | A1 * | 6/2022 | Noar | B62B 9/142 | |
| 2022/0265493 | A1 * | 8/2022 | Baker | A61G 1/04 | |
| 2023/0183997 | A1 * | 6/2023 | Cali | E04H 15/14 | 135/93 |
| 2023/0278618 | A1 * | 9/2023 | Boissonneault | B60N 2/26 | 297/184.13 |

* cited by examiner

REMOVABLE WEATHER SHIELD DEVICE FOR MEDICAL STRETCHERS

TECHNICAL FIELD

The present invention relates generally to patient transportation systems, and more particularly to a lightweight fabric for shielding a patient on a medical stretcher from adverse weather conditions.

BACKGROUND

The statements in this section merely provide background information related to the present disclosure and may not constitute prior art.

Medical stretchers (also referred to as ambulatory stretchers) have long been used for transporting injured, incapacitated or otherwise immobile individuals to or from medical facilities. Typical medical stretchers generally include a wheeled adjustable frame having a mattress and retractable guard rails along the top end. Unlike hospital gurneys which remain indoors at all times, ambulatory stretchers are designed to be used in a variety of different indoor and outdoor settings, as may be encountered by emergency medical responders. As such, these stretchers are constructed from lightweight and durable materials that are designed to withstand adverse weather conditions such as rain, sleet, snow and ice for prolonged periods of time.

Although these stretchers are well suited for inhospitable environments, they do not offer a patient lying on the mattress portion any type of protection from the same. Indeed, it is not uncommon for patients to arrive at a medical facility soaking wet, or covered with snow, for example. As a result, some of these patients develop secondary issues such as a cold or infection caused by their exposure to such conditions. Additionally, patients being transported on a medical stretcher remain fully visible to anyone nearby as they are transported from the ambulance to the facility. This lack of privacy can be demoralizing to a patient who is already suffering from a medical condition.

Accordingly, it would be beneficial to provide a weather shield device for medical stretchers that can be quickly and easily erected and removed, so as to overcome the drawbacks described above.

SUMMARY OF THE INVENTION

The present invention is directed to a weather shield device for a medical stretcher. One embodiment of the present invention can include a generally square-shaped malleable main body member that is constructed from one or more layers of waterproof fabric. An elongated hollow channel can be positioned along the periphery of the main body for receiving and housing a self-supporting frame. The frame and main body can be transitioned between a folded position, a fully open position and an arched position for use with a stretcher.

In one embodiment, a plurality of connectors can be disposed along the sides of the main body and can function to selectively engage the sides of a medical stretcher. When secured onto the stretcher, the frame forms an arched shape so as to fully cover the stretcher with the waterproof main body.

In one embodiment, the frame can include a pair of semi-rigid struts for reducing a bend in the main body in the arched position. The struts also functioning to maintain a set separation distance between the sides of the main body when in the arched position in order to provide headroom for a patient located on the stretcher to which the device is secured.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
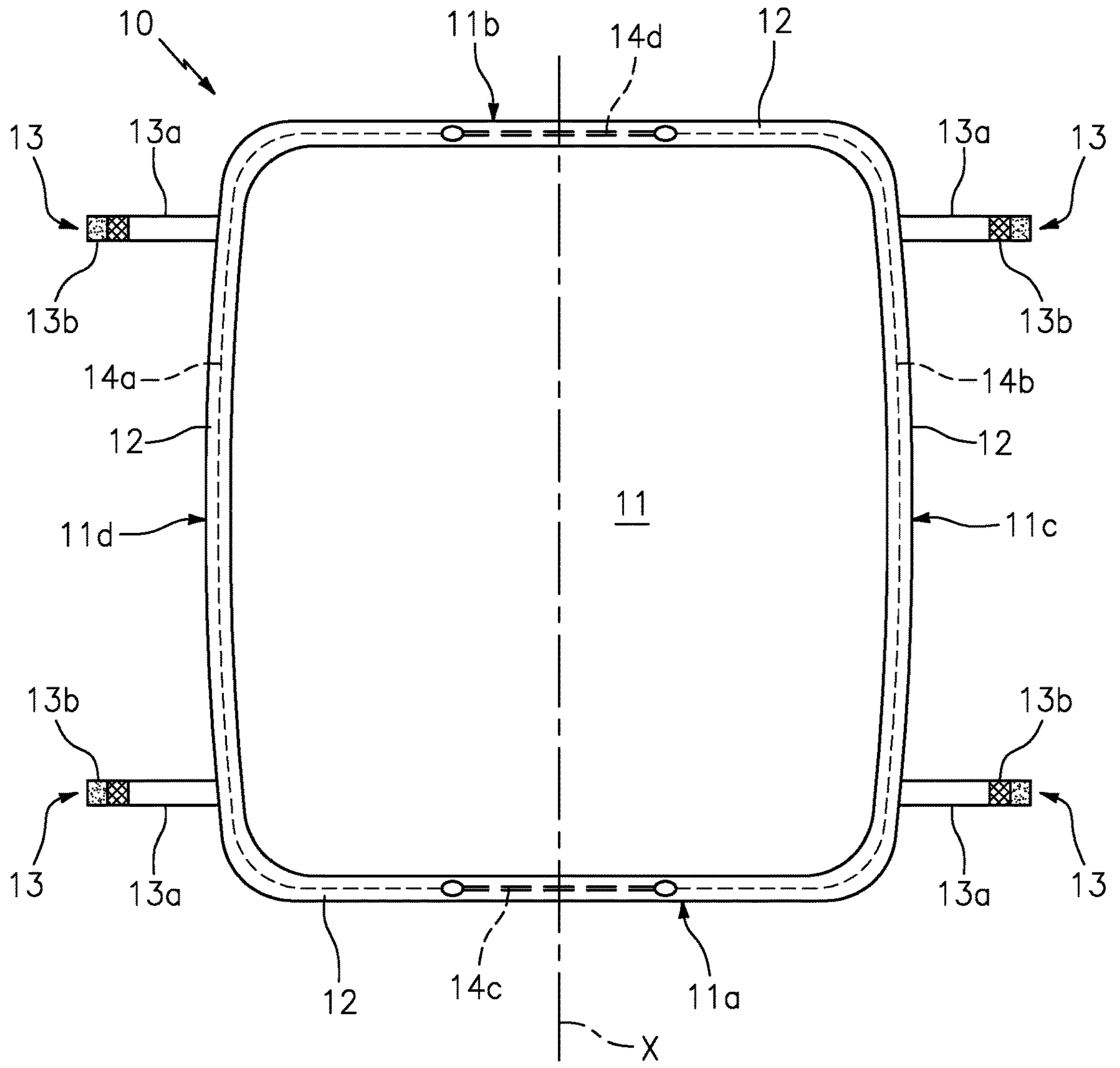
FIG. 1 is a top view of a weather shield device for a medical stretcher in the open position, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" can include any number of different elements that work alone or together to repeatedly join two items together in a nonpermanent manner. Several nonlimiting examples include opposing strips of hook and loop material (i.e. Velcro®), attractively-oriented magnetic elements, flexible strips of interlocking projections with a slider (i.e., zipper), tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

FIGS. 1-4 illustrate one embodiment of a weather shield device for medical stretchers 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown throughout the drawings, the device 10 can include, essentially, a main body 11 having a plurality of stretcher connectors 13 and a self-supporting frame 14 positioned therein.

As shown best at FIG. 1, the main body 11 can include a substantially square-shaped member having a front end 11*a*, a back end 11*b*, and a pair of elongated side edges 11*c* and 11*d*. In the preferred embodiment, each corner of the main body can be rounded to permit easier installation onto a stretcher as will be described below.

In one embodiment, an elongated continuous channel 12 can extend along the periphery of the main body 11 so as to border each of the edges 11*a*-11*d*. As described herein, the channel 12 can be formed in accordance with known construction methodologies so as to form a hollow pathway into which the below described frame 14 will be positioned.

The main body 11 will preferably be constructed from one or more layers of malleable waterproof material such as nylon fabric, for example. In one embodiment, the main body 11 can be generally transparent in nature, so as to permit medical personnel to view the patient at all times, such a feature being particularly beneficial when used at the scene of an accident or other emergency situation, for example. In another embodiment, the main body may be partially or fully opaque, so as to provide the patient with privacy from nearby bystanders. Such a feature being particularly beneficial when performing routine transport of a patient from one facility to another, for example.

Although described above as including a square shape and as having a particular construction material, this is for illustrative purposes only. To this end, other embodiments are contemplated wherein the shape, size and/or material of the main body are different, so as to be utilized with non-standardized stretchers or other such equipment.

In one embodiment, a plurality of stretcher connectors can be disposed along the sides of the main body 11*c* and 11*d*. In the preferred embodiment, each of the connectors can comprise elongated strips of reinforced polyester webbing 13*a* having hook and loop material 13*b* along the distal ends thereof.

As will be described below, the use of such materials allows a user to quickly and easily wrap the polyester webbing 13*a* around the rail of a stretcher, and to secure the same in place via the hook and loop material. Moreover, in the event that it is necessary to quickly remove the device, a user can easily pull on the webbing to disengage the hook and loop material. In this regard, the ability to rapidly remove the device 10 (e.g., using a single hand and in less than 3 seconds) is a critical feature of the inventive concepts in order to ensure the device is not a hinderance to medical personnel responding to an acute medical issue with a patient on the stretcher.

Although described above as utilizing webbing with hook and loop material, this is but one preferred embodiment for connecting the device to a stretcher. To this end, any number of other types of connectors can be utilized herein to secure the device onto any portion of a stretcher or other such device in a removable manner.

In one embodiment, an elongated self-supporting frame 14 can be positioned within the channel 12 of the main body 11. In the preferred embodiment, the frame can include two generally U-shaped resilient frame members 14*a* and 14*b* that are joined with two strut members 14*c* and 14*d* positioned centrally along the front and back ends 11*a* and 11*b*.

Figure 2:
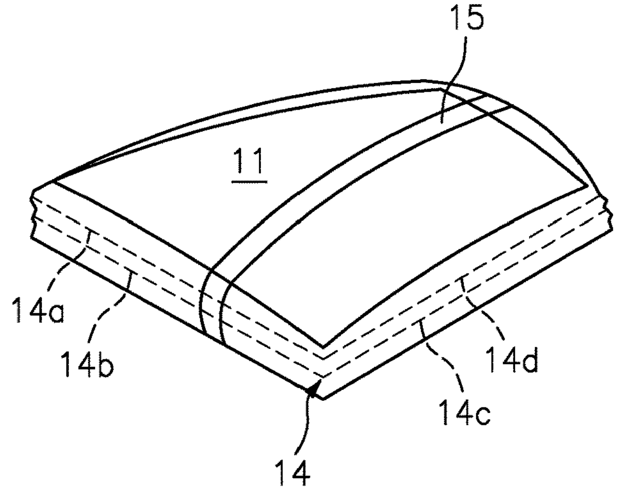
FIG. 2 is a perspective view of the weather shield device for a medical stretcher in the closed position, in accordance with one embodiment of the invention.
Figure 3:
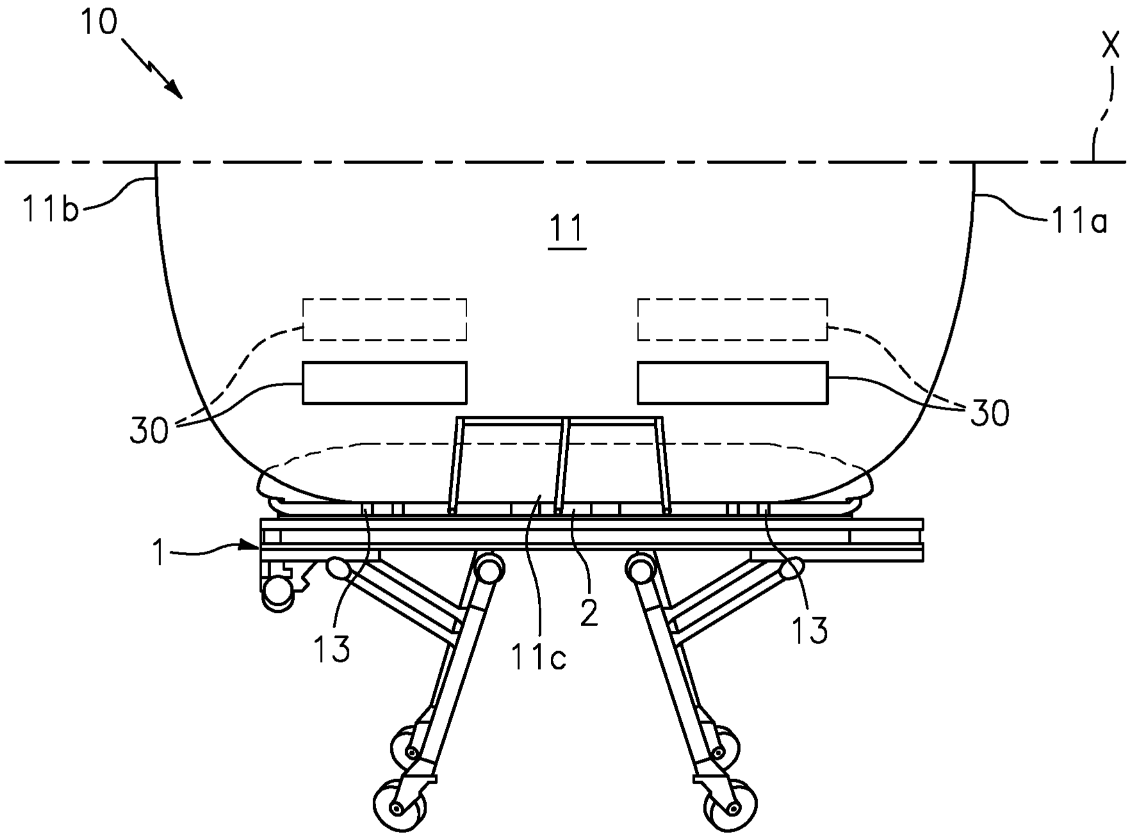
FIG. 3 is a side view of the weather shield device for a medical stretcher in the arched position, in accordance with one embodiment of the invention.
Figure 4:
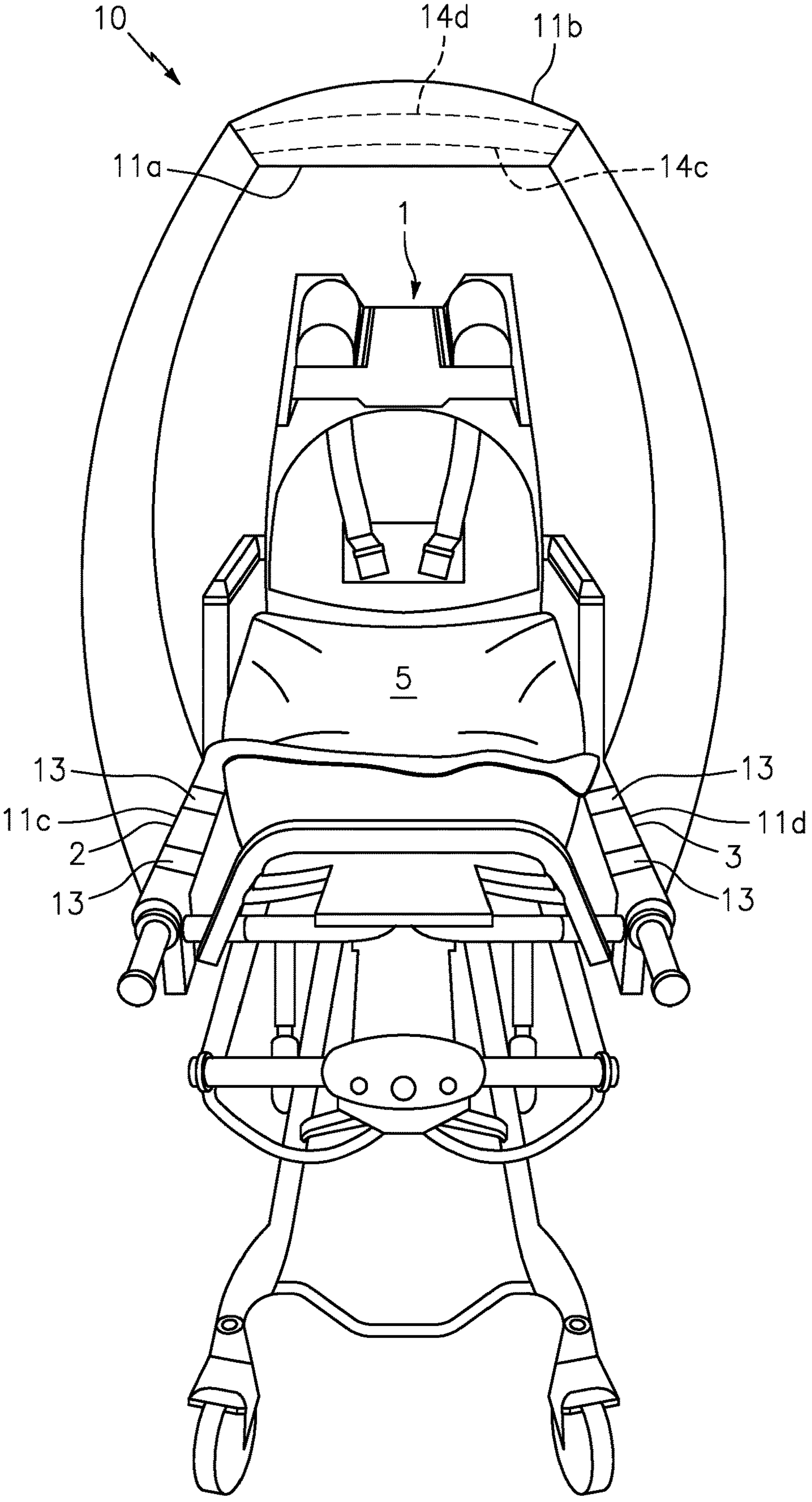
FIG. 4 is a front view of the weather shield device for a medical stretcher in the arched position, in accordance with one embodiment of the invention.

As described herein, resilient frame members 14*a* and 14*b* may be constructed from any appropriate material having a spring-like characteristic, such as metal wire, fiberglass or the like, so as to have memory and to flex between the open position shown at FIG. 1, the folded position shown at FIG. 2, and the arched position shown at FIGS. 3 and 4. Conversely, strut members 14*c* and 14*d* can be constructed from rigid or semi-rigid pieces of metal wire, fiberglass or the like, so as to maintain separation between the sides of the device 10 when in the arched position.

As shown at FIG. 2, the frame and main body 11 can be folded/collapsed into any number of different shapes for storage and can remain in the collapsed position by a storage strap 15 or other such device. When in the collapsed orientation, the frame is stored in a tension bearing state such that when the storage strap 15 is removed, the energy stored within the frame functions to automatically extend the main body 11 into the fully open position shown at FIG. 1 without intervention from a person.

FIGS. 3 and 4 illustrate one embodiment of the weather shield device 10 in operation with a patient stretcher 1. As shown, the device 10 can be positioned such that the major axis X of the main body is aligned parallel to the side railings 2 and 3 (or side frame members) of the stretcher 1. Next, the sides 11*c* and 11*d* of the device can be secured onto the side railings 2 and 3 by the stretcher by the connectors 13.

When so positioned, the front and back ends 11*a* and 11*b* of the device 10 will bend so as to lift and position the semi-rigid struts 14*c* and 14*d* directly above the head and foot sections of the mattress 5 of the stretcher 1 where the patient is located. As shown, the semi-rigid strut portions function to maintain a separation distance between the folded sides of the main body, to prevent the same from forming a pyramid shape along the top. Such a feature being important to keep the main body material away from the head of a patient resting on the stretcher in the seated position, thus providing ample headroom and reducing the likelihood of the patient feeling claustrophobic.

Although described above as including a frame with both rigid and malleable components, other embodiments are contemplated wherein the frame is constructed from a single elongated piece of spring wire or other such material that is capable of functioning in the manner described herein.

As shown, some embodiments of the device further contemplate one or more openings 30 which may be positioned along the main body 11. Such openings being beneficial for allowing medical personnel to reach through the main body in order to have direct physical contact with the patient such as when taking vitals, adjusting an IV or for other such reasons when removal of the device is not necessary. Although not illustrated, optional flaps can be provided so as to selectively close the openings 30 when not in use.

Although dimensions are not critical, the device 10 will preferably be sized so as to conform to the dimensions of particular types of medical stretchers. For example, standard ambulatory stretchers such as that shown at FIGS. 3 and 4 typically include a length of about 84 inches and a width of about 24 inches. As such, one preferred embodiment of the device 10 can include a length (shown by axis X) of 96 inches, and a width of 96 inches, with each of the struts 14*c* and 14*d* having a length of 12 inches.

Accordingly, when in the arched position shown at FIGS. 3 and 4, with the sides of the device 11*a* and 11*b* secured onto the side rails of the stretcher, the top of the arch (e.g., the position of the struts 11*c* and 11*d*) can be about 36 inches above the mattress 5. Such dimensions being suitable to ensure the arched main body covers the mattress and patient when the same are in a fully flat position or a fully upright and seated position.

Of course, many other dimensions are contemplated so as to suit stretchers having different shapes or sizes. Accordingly, the device 10 is not limited to these dimensions.

As described herein, one or more elements of the removable weather shield device for medical stretchers 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A weather shield device for a medical stretcher, said device comprising:

a malleable main body having a front end, a back end, and a pair of sides;

a channel that is disposed along an outside periphery of the main body;

a frame that is positioned within the channel, said frame including a first rigid strut that is positioned along the front end of the main body, a second rigid strut that is positioned along the back end of the main body, and a pair of resilient U-shaped frame members that are positioned along the pair of sides of the main body; and a plurality of connectors that in communication with the pair of sides of the main body, wherein the main body is configured to transition between a folded position, an open position, and an arched position, and in the arched position the main body forms a shape having an open front end, an open back end, and a length that is complementary to a length of a stretcher.

2. The device of claim 1, wherein the main body includes dimensions suitable to cover a medical stretcher in the arched position.

3. The device of claim 1, wherein the main body is constructed from a waterproof fabric.

4. The device of claim 3, wherein the main body is transparent.

5. The device of claim 3, wherein the main body is opaque.

6. The device of claim 1, wherein the frame comprises a self-supporting frame.

7. The device of claim 6, wherein the frame includes at least one resilient frame member.

8. The device of claim 7, wherein the frame includes a plurality of resilient frame members that are constructed from at least one of a metal wire or fiberglass rod.

9. The device of claim 1, wherein each of the plurality of connectors comprises:

an elongated strap having a hook and loop material along a distal end.

10. The device of claim 9, wherein the elongated strap is constructed from polyester webbing.

11. The device of claim 1, wherein a width of the open front end is defined by a length of the first rigid strut; and a width of the open back end is defined by a length of the second rigid strut.

12. The device of claim 1, wherein the frame is constructed to include shape memory and is configured to automatically bias from the folded position to the open position.

13. The device of claim 1, further comprising:

at least one opening that is positioned along the main body.

* * * * *